United States Patent [19]
Beaujean et al.

[11] Patent Number: 5,328,489
[45] Date of Patent: Jul. 12, 1994

[54] NON-AQUEOUS LIQUID BLEACH CONTAINING 40-70% PERBORATE MONOHYDRATE IN A NONIONIC SURFACTANT

[75] Inventors: Hans-Josef Beaujean, Hilden; Karl Schwadtke, Leverkusen; Erich Holz, Duesseldorf, all of Fed. Rep. of Germany

[73] Assignee: Henkel Kommanditgesellschaft auf Aktien, Fed. Rep. of Germany

[21] Appl. No.: 30,306

[22] PCT Filed: Sep. 20, 1991

[86] PCT No.: PCT/EP91/01795
§ 371 Date: Mar. 29, 1993
§ 102(e) Date: Mar. 29, 1993

[87] PCT Pub. No.: WO92/06166
PCT Pub. Date: Apr. 16, 1992

[30] Foreign Application Priority Data

Sep. 29, 1990 [DE] Fed. Rep. of Germany ....... 4030850

[51] Int. Cl.⁵ .......................... C11D 1/66; C11D 3/39; D06L 3/02; D06L 3/16
[52] U.S. Cl. .......................................... 8/111; 8/137; 252/95; 252/99; 252/104; 252/174.21; 252/DIG. 1; 252/DIG. 14
[58] Field of Search ................... 252/95, 99, 102, 104, 252/174.21, 186.43, DIG. 14; 8/111, 137

[56] References Cited

U.S. PATENT DOCUMENTS

| | | | |
|---|---|---|---|
| 3,658,712 | 4/1972 | Lindner et al. | 252/99 |
| 3,850,831 | 11/1974 | Hellsten | 252/99 |
| 4,264,466 | 4/1981 | Carleton | 252/99 |
| 4,426,203 | 1/1984 | Abel | 8/138 |
| 4,655,954 | 4/1987 | Broze | 252/102 |
| 4,661,280 | 4/1987 | Ouhadi | 252/99 |
| 4,772,412 | 9/1988 | Green | 252/96 |
| 4,828,723 | 5/1989 | Cao | 252/99 |
| 5,176,713 | 1/1993 | Dixit | 8/137 |

FOREIGN PATENT DOCUMENTS

| | | |
|---|---|---|
| 1279878 | 1/1968 | Fed. Rep. of Germany . |
| 1267368 | 5/1968 | Fed. Rep. of Germany . |
| 2448716 | 4/1976 | Fed. Rep. of Germany . |
| 3704876 | 8/1987 | Fed. Rep. of Germany . |

OTHER PUBLICATIONS

Derwent Accession, No. 87-070314, Questel Telesystems (WPIL), Derwent Publications Ltd., London, 1987 (no month available).

*Primary Examiner*—Dennis Albrecht
*Attorney, Agent, or Firm*—Ernest G. Szoke; Wayne C. Jaeschke; Real J. Grandmaison

[57] ABSTRACT

A paste-form bleaching preparation containing 50 to 65% by weight perborate monohydrate in a liquid medium which consists predominantly or completely of addition products of ethylene oxide and long-chain saturated alcohols.

12 Claims, No Drawings

NON-AQUEOUS LIQUID BLEACH CONTAINING 40-70% PERBORATE MONOHYDRATE IN A NONIONIC SURFACTANT

BACKGROUND OF THE INVENTION

1. Field of he Invention

This invention relates to inorganic peroxy compounds of the type used above all as laundry bleaching agents.

2. Description of the Invention

Powder-form laundry detergents which contain all the active substances required for washing and which, at the same time, are sufficiently stable in storage in the solid state have been known for some time. By contrast, liquid laundry detergents, which have been developed to an increasing extent in recent years, often show only limited stability in storage on account of interactions between individual ingredients. Above all, the incorporation of bleaching agents in liquid systems presents major problems. DE-ASS I 267 368 and I 279 878 and DE-OS 3 704 876 are cited as representative of the numerous proposals which have been made on this subject. Separate dosing of the bleaching agent has been proposed as an alternative, not least because of the hitherto unsolved problem of incompatibility between bleaching agents and other detergent ingredients, aqueous solutions of hydrogen peroxide being used as the bleaching agents in the majority of cases. On account of the caustic properties of hydrogen peroxide, these solutions have to be heavily diluted, at least for household laundry, and accordingly contain little active oxygen.

DESCRIPTION OF THE INVENTION

The present invention provides another solution to the problem in the form of a paste-form preparation of perborate monohydrate. This preparation contains 40 to 70% by weight and preferably 50 to 65% by weight perborate monohydrate in a liquid medium which consists predominantly or completely of addition products of ethylene oxide (EO) and long-chain saturated alcohols.

The new paste-form preparations of perborate monohydrate are chemically and physically very stable and are easy and convenient to handle and dose. They dissolve quickly in water or wash liquors so that the high content of active oxygen is fully available in a very short time.

The perborate monohydrate used in accordance with the invention is an alkali metal perborate, more particularly sodium perborate monohydrate, to which the formula $NaBO_3 \cdot H_2O$ is generally attributed. As far as is known at the present time, sodium perborate zenohydrate is in reality a cyclic diperoxodiborate with the formula $Na_2H_4B_2O_8$ which does not contain any water of hydration. It has a theoretical active oxygen content of 16.0% by weight, although sodium perborates containing at least 15% by weight active oxygen are also regarded as monohydrate in the context of the present invention.

In the paste-form preparations according to the invention, the perborate zenohydrate is suspended, optionally together with other solids, in a liquid medium consisting predominantly or completely of certain nonionic surfactants.

The nonionic surfactants to be used in accordance with the invention are preferably liquid addition products of ethylene oxide and long-chain saturated alcohols which have a solidification point of, in particular, 10° C. or lower. Addition products of 2 to 7 mol ethylene oxide and longchain saturated alcohols containing 12 to 18 carbon atoms are particularly preferred. These addition products are generally mixtures of mere or less highly ethoxylated alcohols, i.e. the figures represent average values, and the products themselves may also contain certain amounts of compounds having higher or lever degrees of ethoxylation. In some cases, it can be useful to use a mixture of two addition products with a relatively high and a relatively low average degree of ethoxylation. It is also possible to replace up to one third of the nonionic surfactants of this type by other nonionic surfactants, for example ethoxylation products of alkylphenols or mixed addition products of ethylene oxide and propylene oxide, providing this mixture of nonionic surfactants, optionally together with other organic liquids, remains liquid at room temperature and preferably down to 10° C. Examples of suitable nonionic surfactants are the addition products of 2 mol ethylene oxide and $C_{12/14}$ coconut oil fatty alcohol (Dehydol®LS 2), of 5 mol ethylene oxide and $C_{12/18}$ coconut oil fatty alcohol (Dehydol®LT 5) and the addition product of 7 mol ethylene oxide and $C_{13/15}$ oxoalcohol (Lutensol®A 07).

The liquid phase of the nonionic surfactants may contain other organic liquids which may make up as much as 10% by weight and preferably 3 to 10% by weight of the preparation as a whole. These organic liquids are used above all to establish the correct overall viscosity and consistency. These liquids should not of course be incompatible with the other constituents of the preparation. Accordingly, these liquids are preferably selected from the group consisting of paraffin oil, polypropylene glycol (molecular weight between approx. 200 and approx. 400), propylene carbonate, ethanol, isopropanol and mixtures thereof. Paraffin oil with a boiling range between approx. 250° and approx. 500° C. is particularly preferred. Water has an adverse effect on the stability of the preparations according to the invention. For this reason, the constituents are selected so that the total water content of the preparations is preferably below 3% by weight and, more particularly, is not more than 1% by weight.

In addition to the constituents already mentioned, the preparations may contain other active substances and auxiliaries in quantities of up to 10% by weight and preferably in quantities of 2 to 10% by weight, based on the total weigh=of the preparation, in dissolved or dispersed form. The additives in question may perform various functions. Thus, additions of alkali metal soaps increase the viscosity of the liquid phase. Heavy metal complexing agents, such as aminopolycarboxylic acids and polyphosphonic acids, for example ethylenediamine tetraacetic acid and hydroxyethane diphosphonic acid or alkali metal salts thereof, perform the function of avoiding decomposition of the perborate monohydrate by traces of heavy metals. By adding other active substances, it is possible to obtain other effects desirable in the washing process in addition to the actual effect of the perborate monohydrate in the practical application of the preparations. Examples of such active substances are redeposition inhibitors, for example carboxymethyl cellulose and hydroxyethyl cellulose, and optical brighteners. A certain diluting effect may be obtained as and when necessary by the addition of anhydrous inorganic salts.

In the most simple case, the preparations according to the invention may be produced by mixing all the components for a sufficiently long time. This is possible particularly when all the solids which are to be suspended in the liquid are available in sufficiently fine form. In a preferred embodiment, more than 90% by weight of the suspended solids are present in the pastes in the form of particles below 50 μm and preferably below 25 μm in diameter (measurable with a Helos Sympatec particle size analyzer - measuring principle: Frauenhofer diffraction). The viscosity of the preparations is dependent on the one hand upon the solids content and, on the other hand, upon the viscosity of the liquid phase. Through the choice of suitable quantitative ratios and suitable liquid components, the viscosity of the paste is preferably adjusted to values of approx. 50 to approx. 200 Pas (as measured with a plate/ plate rotational viscosimeter at a shear rate of $1s^{-1}$).

If starting materials having considerably larger particle diameters are to be processed, the components are subjected after mixing to a grinding process. It is known in principle that pastes of inorganic substances in organic solvents can be produced by wet grinding in mills with high shear forces (U.S. No. 4,115,308). However, the high temperatures occurring in the material being ground in this grinding process are problematical. This applies in particular to temperature-sensitive mixtures of per compounds and oxidizable material. Accordingly, the preparations according to the invention are preferably produced by a process in which the components of the preparation, after having been mixed, are ground on a three-roll stand. In this unit, the mixture of the components is passed between rollers which contra-rotate at different peripheral speeds with or without a small free gap in between. Since the rollers can be cooled, the material being ground never reaches temperatures which could endanger its stability. If necessary, passage through the roller unit can repeated one or more times until the desired particle size of the solids is reached. It can also be useful in some cases to subject the ground material leaving the three-roll stand to a homogenizing step using typical mixers. In case, however, excessive temperature should again be avoided. The final paste is preferably packed in plastic tubes or cartridges.

The new preparations are preferably used in domestic and institutional laundering. By virtue of their pastelike consistency, the preparations may be dosed very easily both by hand and by suitable devices. The quantity used is generally selected so that the wash liquor contains between 30 and 300 ppm active oxygen from perborate monohydrate. In addition to their use as bleaching agents, however the preparations may also be used as oxidizing agents for other purposes, for example for developing oxidation dyes or for disinfection.

EXAMPLES

1. A mixture of 1180 g perborate monohydrate (active oxygen content 15.3%), 800 g Dehydol ®LS 3 ($C_{12/14}$ coconut oil fatty alcohol +3 ethylene oxide) and 20 g sodium soap of saturated tallow fatty acids was mixed for 5 minutes in a Lodige mixer. The mixture was then delivered to a three-roll stand (type WDLH/ 300 manufactured by Lehmann of Aalen, Fed. Rep. of Germany) and was ground twice therein. The particle size of the solids in the suspension formed was determined with a Helos Sympatec particle size analyzer. 90% by weight of the particles had a diameter below 20 μm. The viscosity of the paste was 50 Pas, as measured at 25° C. with a rotational viscosimeter of the plate/plate type (Carri-Med CS Rheometer) at a shear rate of $1s^{-1}$.

2.-7. These preparations were produced in the same way as described in Example 1. The compositions of the starting mixtures are shown in Table 1.

TABLE 1

| (Contents in % by weight) | Examples | | | | | |
|---|---|---|---|---|---|---|
| | 2 | 3 | 4 | 5 | 6 | 7 |
| Perborate monohydrate (Quality 40, Degussa) | 65 | 65 | 60 | 59.5 | 59 | 59.5 |
| Dehydol ®LS 3 | 16 | | | | | |
| Dehydol ®LT 7 ($C_{12/18}$ coconut oil alcohol + 7 EO (Henkel)) | 15 | 35 | 40 | 40 | 40 | 30 |
| Na soap of hydrogenated tallow fatty acids | | | | 0.5 | 1.0 | 0.5 |
| Paraffin oil (Bp. 340–495° C.) | 4 | | | | | 10 |

In all the suspensions, the percentage of particles smaller than 50 μm in size was above 98% by weight while the percentage of particles smaller than 20 μm in size was above 90% by weight. All the pastes had viscosities of approx. 50 Pas (25° C.) after production.

In storage tests, none of the preparations showed any evolution of gas for 6 weeks at 20° C. and 40° C. There was no significant change in viscosity over that period. All the preparations were easy to dose and dissolved quickly in cold water.

We claim:

1. A substantially non-aqueous composition in the form of a paste, said composition consisting essentially of from 50 to 65% by weight of perborate monohydrate in a liquid medium consisting essentially of the addition products of 2 to 7 mols of ethylene oxide and $C_{12}$–$C_{18}$ saturated alcohols.

2. A composition as in claim 1 containing up to 10% by weight of an organic liquid selected from the group consisting of paraffin oil, polypropylene glycol, propylene carbonate, ethanol, isopropanol, and mixtures thereof.

3. A composition as in claim 1 containing up to 10% by weight of an auxiliary component selected from the following: a redeposition inhibitor, optical brightener, anhydrous inorganic salt, heavy metal complexing agent, soap, and mixtures thereof.

4. A composition as in claim 1 wherein at least 90% by weight of the solids therein have a particle size of less than 50 um.

5. A composition as in claim 1 wherein said perborate monohydrate comprises an alkali metal perborate.

6. A composition as in claim 1 wherein said perborate monohydrate is suspended in said liquid medium.

7. A composition as in claim 1 wherein said liquid medium has a solidification point of 10° C. or lower.

8. A composition as in claim 1 containing less than 3% by weight of water.

9. A composition as in claim 1 having a viscosity of from about 50 to about 200 Pas.

10. A process for producing the composition of claim 1 comprising mixing all the components of said composition, and grinding the resulting mixture at least once on a roll stand between rollers rotating at different peripheral speeds.

11. A process as in claim 10 including homogenizing the ground mixture.

12. The process of cleaning laundry comprising providing a wash liquor and adding to said wash liquor a bleaching effective amount of the composition of claim 1 and contacting soiled laundry with said wash liquor.

* * * * *